United States Patent
Telgenhoff et al.

(10) Patent No.: US 12,371,536 B2
(45) Date of Patent: Jul. 29, 2025

(54) METHOD FOR PREPARING A FUNCTIONALIZED POLYORGANOSILOXANE

(71) Applicant: Dow Silicones Corporation, Midland, MI (US)

(72) Inventors: Michael Telgenhoff, Midland, MI (US); Eric Joffre, Midland, MI (US); Nanguo Liu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/605,013

(22) Filed: Mar. 14, 2024

(65) Prior Publication Data

US 2024/0254289 A1    Aug. 1, 2024

Related U.S. Application Data

(63) Continuation of application No. 17/277,602, filed as application No. PCT/US2019/064346 on Dec. 4, 2019, now abandoned.

(60) Provisional application No. 62/783,224, filed on Dec. 21, 2018.

(51) Int. Cl.
| | | |
|---|---|---|
| *C08G 77/38* | (2006.01) | |
| *C08G 77/08* | (2006.01) | |
| *C08G 77/12* | (2006.01) | |
| *C08G 77/18* | (2006.01) | |

(52) U.S. Cl.
CPC ............. *C08G 77/38* (2013.01); *C08G 77/08* (2013.01); *C08G 77/12* (2013.01); *C08G 77/18* (2013.01)

(58) Field of Classification Search
CPC ........ C08G 77/38; C08G 77/08; C08G 77/12; C08G 77/18
USPC ....................................................... 524/478
See application file for complete search history.

(56) References Cited

U.S. PATENT DOCUMENTS

| | | | |
|---|---|---|---|
| 3,159,601 A | 12/1964 | Ashby | |
| 3,175,993 A | 3/1965 | Weyenberg | |
| 3,220,972 A | 11/1965 | Lamoreaux | |
| 3,296,291 A | 1/1967 | Chalk et al. | |
| 3,419,593 A | 12/1968 | Willing | |
| 3,516,946 A | 7/1970 | Modic | |
| 3,814,730 A | 6/1974 | Karstedt | |
| 3,989,668 A | 11/1976 | Lee et al. | |
| 4,374,967 A | 2/1983 | Brown et al. | |
| 4,766,176 A | 8/1988 | Lee et al. | |
| 4,784,879 A | 11/1988 | Lee et al. | |
| 5,017,654 A | 5/1991 | Togashi et al. | |
| 5,036,117 A | 7/1991 | Chung et al. | |
| 5,175,325 A | 12/1992 | Brown et al. | |
| 5,422,412 A | 6/1995 | Morita et al. | |
| 5,536,803 A | 7/1996 | Fujiki et al. | |
| 5,581,008 A | 12/1996 | Kobayashi | |
| 5,625,023 A | 4/1997 | Chung et al. | |
| 5,654,362 A | 8/1997 | Schulz, Jr. et al. | |
| 6,127,502 A | 10/2000 | Krahnke et al. | |
| 6,169,156 B1 | 1/2001 | Yoshitake | |
| 6,175,031 B1 | 1/2001 | Tachikawa | |
| 6,235,832 B1 | 5/2001 | Deng et al. | |
| 6,239,246 B1 | 5/2001 | Takahashi et al. | |
| 6,265,518 B1 | 7/2001 | Krahnke et al. | |
| 6,586,535 B1 | 7/2003 | Clark et al. | |
| 6,753,438 B2 | 6/2004 | Taylor et al. | |
| 6,806,339 B2 | 10/2004 | Cray et al. | |
| 7,064,173 B2 | 6/2006 | Rubinsztajn et al. | |
| 7,148,370 B1 | 12/2006 | Rubinsztajn et al. | |
| 7,378,482 B2 | 5/2008 | Asch et al. | |
| 7,429,636 B2 | 9/2008 | Asch et al. | |
| 7,432,338 B2 | 10/2008 | Chapman et al. | |
| 7,449,536 B2 | 11/2008 | Chapman et al. | |
| 7,642,332 B2 | 1/2010 | Kennedy et al. | |
| 7,687,591 B2 | 3/2010 | Bhagwagar et al. | |
| 7,906,605 B2 | 3/2011 | Cray et al. | |

(Continued)

FOREIGN PATENT DOCUMENTS

| | | |
|---|---|---|
| CN | 108586747 | 9/2018 |
| EP | 0347895 | 12/1989 |

(Continued)

OTHER PUBLICATIONS

Wang et al., A New Fluorinated Polysioloxane with Good Optical Properties at High Frequency Based on Easily Available Tetraethoxysilane, Macromolecules, vol. 50, No. 23, Dec. 12, 2017, pp. 9394-9402 (Year: 2017).*

Grand, et al., "Anhydrous formation of foamed silicone elastomers using the PiersRubinsztajn reaction", Polymer, vol. 53, No. 15, May 20, 2012, pp. 3135-3142.

Grand, et al., "Testing the Functional Tolerance of the Piers-Rubinsztajn Reaction: A New Strategy for Funtional Silicones", The Royal Society of Chemistry 2010, 48 pages.

Rubinsztajn, et al., "A New Polycondensation Process for the Preparation of Polysiloxane Copolymers", Macromolecules, 2005, vol. 38, Sep. 30, 2004, pp. 1061-1063.

(Continued)

*Primary Examiner* — Robert S Jones, Jr.
*Assistant Examiner* — Elizabeth Amato
(74) *Attorney, Agent, or Firm* — Catherine U. Brown

(57) ABSTRACT

A method for preparing functionalized polyorganosiloxanes is disclosed. The method includes 1) combining starting materials including A) a boron-containing Lewis acid catalyst, and B) an organosilicon compound having an average, per molecule of at least 1 silicon bonded groups of the formula —OR$^2$; wherein each R$^2$ is an independently selected monovalent hydrocarbon group of 1 to 6 carbon atoms, thereby forming a catalyzed mixture; and thereafter 2) adding the catalyzed mixture into a starting material including C) an organohydrogensiloxane having at least 1 silicon bonded hydrogen atom per molecule, thereby preparing a product comprising the functionalized polyorganosiloxane and a by-product comprising HR$^2$.

20 Claims, No Drawings

(56) References Cited

U.S. PATENT DOCUMENTS

| | | |
|---|---|---|
| 7,999,053 B2 | 8/2011 | Sutton et al. |
| 8,304,543 B2 | 11/2012 | Jialanella et al. |
| 8,422,317 B2 | 4/2013 | Kamp et al. |
| 8,722,153 B2 | 5/2014 | Ekeland |
| 8,933,177 B2 | 1/2015 | Hori et al. |
| 9,093,625 B2 | 7/2015 | Koshikawa et al. |
| 9,156,948 B2 | 10/2015 | Brandstadt et al. |
| 9,334,294 B2 | 5/2016 | Liu |
| 9,388,284 B2 | 7/2016 | Liu et al. |
| 9,422,317 B2 | 8/2016 | Liu et al. |
| 9,518,073 B2 | 12/2016 | Liu et al. |
| 9,530,946 B2 | 12/2016 | Liu et al. |
| 9,562,149 B2 | 2/2017 | Cray et al. |
| 9,593,209 B2 | 3/2017 | Dent et al. |
| 9,670,392 B2 | 6/2017 | Larson et al. |
| 9,718,925 B2 | 8/2017 | Jiang et al. |
| 9,718,927 B2 | 8/2017 | Liu et al. |
| 9,862,867 B2 | 1/2018 | Gordon et al. |
| 9,944,758 B2 | 4/2018 | Jiang et al. |
| 10,138,258 B2 | 11/2018 | Christiano et al. |
| 11,643,506 B2 | 5/2023 | Lu et al. |
| 11,787,908 B2 | 10/2023 | Joffre et al. |
| 11,905,375 B2 | 2/2024 | Joffre et al. |
| 2003/0088042 A1 | 5/2003 | Griswold et al. |
| 2003/0139287 A1 | 7/2003 | Deforth et al. |
| 2004/0127668 A1 | 7/2004 | Rubinsztajn et al. |
| 2004/0254274 A1 | 12/2004 | Griswold |
| 2005/0038188 A1 | 2/2005 | Ahn et al. |
| 2005/0206680 A1 | 9/2005 | Chen et al. |
| 2005/0256286 A1 | 11/2005 | Asch et al. |
| 2006/0189767 A1 | 8/2006 | Bhagwagar et al. |
| 2007/0289495 A1 | 12/2007 | Cray et al. |
| 2009/0137764 A1 | 5/2009 | Sutton et al. |
| 2009/0171010 A1 | 7/2009 | Kilgour et al. |
| 2011/0287267 A1 | 11/2011 | Hori et al. |
| 2013/0320392 A1 | 12/2013 | Koshikawa et al. |
| 2014/0187733 A1 | 7/2014 | Okawa et al. |
| 2014/0306259 A1 | 10/2014 | Liu et al. |
| 2014/0309380 A1 | 10/2014 | Liu et al. |
| 2014/0309449 A1 | 10/2014 | Liu et al. |
| 2014/0309450 A1 | 10/2014 | Liu |
| 2016/0002513 A1 | 1/2016 | Gordon et al. |
| 2016/0009865 A1 | 1/2016 | Jiang et al. |
| 2016/0032060 A1 | 2/2016 | Jiang et al. |
| 2016/0053056 A1 | 2/2016 | Gould et al. |
| 2016/0289390 A1 | 10/2016 | Liu et al. |
| 2017/0029571 A1 | 2/2017 | Kusunoki et al. |
| 2017/0145148 A1 | 5/2017 | Christiano et al. |
| 2017/0335064 A1 | 11/2017 | Stapleton et al. |
| 2020/0010734 A1 | 1/2020 | Dash et al. |
| 2020/0140618 A1 | 5/2020 | Gohndrone et al. |
| 2020/0208033 A1 | 7/2020 | Lu et al. |
| 2020/0231755 A1 | 7/2020 | Gohndrone et al. |
| 2020/0231756 A1 | 7/2020 | Gohndrone et al. |
| 2020/0325371 A1 | 10/2020 | Dash et al. |
| 2022/0017617 A1 | 1/2022 | Wu et al. |

FOREIGN PATENT DOCUMENTS

| | | | |
|---|---|---|---|
| EP | 0556023 | 8/1993 | |
| WO | 2002081551 | 10/2002 | |
| WO | 2013142956 | 10/2013 | |
| WO | WO-2013142956 A1 * | 10/2013 | ............. C08G 77/08 |
| WO | 2014059132 | 4/2014 | |

OTHER PUBLICATIONS

Thompson, et al., "Rapid Assembly of Complex 3D Siloxane Architectures", JACS Communications, vol. 130, No. 1, Oct. 12, 2007, pp. 32-33.

Wang, J., et al., "A New Flourinated Polysiloxane with Good Optical Properties and Low Dielectric Constant at High Frequency Based on Easily Available Tetraethoxysilane (TEOS)", Macromolecules, vol. 50, No. 23, Dec. 12, 2017, pp. 9343-9402.

Yoshikawa, et al., "Polymerization of Cyclododecasiloxanes with Si—H and Si-OEt Side Groups by the Piers-Rubinsztajn Reaction", Bulletin of the Chemical Society of Japan, vol. 91, No. 5, May 15, 2018, pp. 747-753.

Chen, "Intrinsic High Refractive Index Siloxane-Sulfide Polymer Networks Having High Thermostability and Transmittance via Thiol-Ene Cross-Linking Reaction", Macromolecules, 2018, vol. 51, No. 19, pp. 7567-7573.

Thompson, "Controlled Geometry Functional Silicones Using B(C6F5)3-Catalyzed Condensation", Department of Chemistry, 2009, vol. 50, No. 2, pp. 814-815.

Noll, "Chemistry and Technology of Silicones", 1968 ch. 1, pp. 1-9.

Gretton et al., "The Use of Piers-Rubinsztajn Conditions for the Placement of Triarylamines Pendant to Silicone Polymers", Macromolecules, 45, 2012, pp. 723-728.

Liao, et al., "Living synthesis of silicone polymers controlled by humidity", European Polymer Journal, 107, 2018, pp. 287-293.

* cited by examiner

METHOD FOR PREPARING A FUNCTIONALIZED POLYORGANOSILOXANE

CROSS-REFERENCE TO RELATED APPLICATIONS

This application is a continuation of U.S. patent application Ser. No. 17/277,602, currently pending and filed on 18 Mar. 2021, and this application claims priority thereto under 35 U.S.C. § 120 and 35 U.S.C. § 365(c); and U.S. patent application Ser. No. 17/277,602 is a U.S. national stage filing under 35 U.S.C. § 371 of PCT Application No. PCT/US19/064346 filed on 4 Dec. 2019, which claims the benefit of U.S. Provisional Patent Application No. 62/783,224 filed 21 Dec. 2018 under 35 U.S.C. § 119(e). U.S. patent application Ser. No. 17/277,602; PCT Application No. PCT/US19/064346 and U.S. Provisional Patent Application No. 62/783,224 are hereby incorporated by reference.

TECHNICAL FIELD

A method for preparing a functionalized polyorganosiloxane is disclosed. More particularly, the method includes combining a boron containing Lewis acid catalyst and an alkoxysilyl functional organosilicon compound to form a catalyzed mixture and thereafter adding the catalyzed mixture to an SiH functional organosilicon compound.

BACKGROUND

Piers-Rubinsztajn reactions involving silicon hydride functional organosilicon compounds and alkoxysilyl functional organosilicon compounds have been disclosed where the Piers-Rubinsztajn reaction catalyst, silicon hydride functional organosilicon compound and alkoxysilyl functional compound are combined concurrently, or where the silicon hydride functional organosilicon compound and alkoxysilyl functional compounds are mixed before the catalyst is added thereto. These methods suffer from the drawback of the catalyst being deactivated, resulting in slowing of the reaction rate and/or catalyst deactivation and/or poor yields.

SUMMARY

A method for preparing a functionalized polyorganosiloxane comprises:
1) combining starting materials comprising
   A) a boron-containing Lewis acid, and
   B) an organosilicon compound having an average, per molecule of at least 1 silicon bonded group of the formula —$OR^2$; wherein each $R^2$ is an independently selected monovalent hydrocarbon group of 1 to 6 carbon atoms, thereby forming a catalyzed mixture; and thereafter
2) adding the catalyzed mixture into a starting material comprising
   C) an organohydrogensiloxane having at least 1 silicon bonded hydrogen atom per molecule, thereby preparing a product comprising the functionalized polyorganosiloxane and a by-product comprising a compound of formula $HR^2$.

DETAILED DESCRIPTION OF THE INVENTION

This invention relates to the method for preparing a functionalized polyorganosiloxane. The method comprises:

1) combining starting materials comprising
   A) the boron-containing Lewis acid, and
   B) the organosilicon compound having an average, per molecule of at least 1 silicon bonded group of the formula —$OR^2$; wherein each $R^2$ is an independently selected monovalent hydrocarbon group of 1 to 6 carbon atoms, thereby forming a catalyzed mixture; and thereafter
2) adding the catalyzed mixture into a starting material comprising
   C) the organohydrogensiloxane having at least 1 silicon bonded hydrogen atom per molecule, thereby preparing a product comprising the functionalized polyorganosiloxane and a by-product comprising a compound of formula $HR^2$. The starting materials in step 1) are free of SiH functional organosilicon compounds. The starting materials in step 2) may be free of alkoxysilyl functional organosilicon compounds before beginning the addition of the catalyzed mixture. "Free of" as used herein includes none, alternatively an amount non-detectable by GC, and alternatively an amount insufficient to deactivate A) the boron-containing Lewis acid used as catalyst for reacting starting materials B) and C). The starting materials used in the method may optionally further comprise D) a solvent. One or more of starting materials A), B) and C) may be dissolved in a solvent before adding in the method.

The method may optionally further comprise one or more additional steps selected from the group consisting of:
   adding additional boron-containing Lewis acid, to C) the organohydrogensiloxane before adding the catalyzed mixture into the starting material comprising the organohydrogensiloxane in step 2);
   during and/or after step 2), removing a by-product comprising $HR^2$; and
   neutralizing residual boron-containing Lewis acid in the product; and
   recovering the functionalized polyorganosiloxane. The additional boron-containing Lewis acid may be the same as, or different from, the boron-containing Lewis acid used in step 1).

The method may optionally further comprise adding additional boron-containing Lewis acid, to C) the organohydrogensiloxane before adding the catalyzed mixture to the organohydrogensiloxane in step 2). The additional boron containing Lewis acid may be present in an amount of 5 ppm to 250 ppm based on weight of C) the organohydrogensiloxane.

In steps 1) and 2) of this method, the boron containing Lewis acid, and when present, and any additional boron containing Lewis acid, may be provided in a total amount of 50 ppm to 6000 ppm (alternatively 50 to 600 ppm), based on combined weights of the organosilicon compound and the organohydrogensiloxane. The Lewis acid in step 1) and the additional Lewis acid, when used in step 2), may be the same or different Lewis acids, as described above for component A). Alternatively, in step 1), the boron containing Lewis acid may be present in an amount of 5 ppm to 600 ppm (alternatively 15 ppm to 600 ppm and alternatively 15 ppm to 250 ppm) based on weight of B) the organosilicon compound.

The method described herein may be performed at relatively low temperatures. The method may be performed at a temperature of 5° C. to 70° C., alternatively 5° C. to 65° C., alternatively 10° C. to 60° C., alternatively 15° C. to 50° C., alternatively 20° C. to 35° C., alternatively 5° C. to 30° C., and alternatively 30° C. Steps 1) and 2) may be performed at the same temperature or different temperatures. Alternatively, the catalyzed mixture in step 1) may be heated to 40° C. to 70° C. before step 2). Alternatively, after heating to 40° C. to 70° C., the catalyzed mixture may be cooled to less than 40° C. in step 2). Alternatively, step 2) may be performed at a temperature of 5° C. to 40° C. Alternatively, the method may be performed at a temperature of 10° C. to <25° C.

The method described above may optionally further comprise: 3) neutralizing residual boron-containing Lewis acid in the product. Neutralizing can be performed by any convenient means, such as by adding E) a neutralizing agent.

The method described above may optionally further comprise recovering the functionalized polyorganosiloxane from the product. The method may optionally further comprise: during and/or after step 2), removing a by-product comprising $HR^2$, where $R^2$ is as described above. The by-product may be removed by any convenient means, e.g., by stripping, liquefying, and/or burning. For example, when $R^2$ is methyl (the by-product is methane), the by-product may be removed by burning. Alternatively, if a particulate by-product is present, e.g., as a result of neutralization, particulate by-product may be removed by any convenient means, such as filtration.

Starting Material A) Boron-Containing Lewis Acid

Starting material A) in the method described herein is a boron-containing Lewis acid. The boron-containing Lewis acid may be a trivalent boron compound with at least one perfluoroaryl group, alternatively 1 to 3 perfluoroaryl groups per molecule, alternatively 2 to 3 perfluoroaryl groups per molecule, and alternatively 3 perfluoroaryl groups per molecule. The perfluoroaryl groups may have 6 to 12 carbon atoms, alternatively 6 to 10, and alternatively 6 carbon atoms. The A) the boron-containing Lewis Acid catalyst is selected from the group consisting of $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B—CH_2CH_2Si(CH_3)$. Alternatively, the boron-containing Lewis acid catalyst may be tris(pentafluorophenyl)borane of formula $B(C_6F_5)_3$. Such boron-containing Lewis acids are commercially available from, e.g., Millipore Sigma of St. Louis, Missouri, USA.

Starting Material B) Alkoxysilyl-Functional Organosilicon Compound

Starting material B) in the method described herein is an organosilicon compound having an average, per molecule, of at least 1 (alternatively 1 to 6, alternatively 1 to 4, alternatively 1 to 3, and alternatively 1 to 2) silicon bonded alkoxy groups of the formula $—OR^2$; wherein each $R^2$ is an independently selected monovalent hydrocarbon group of 1 to 6 carbon atoms. Alternatively, each $R^2$ may be an alkyl group such as methyl, ethyl, propyl, butyl, pentyl and hexyl, (including branched and linear isomers, e.g., n-propyl or iso-propyl, n-butyl, iso-butyl, t-butyl, and sec-butyl); alternatively methyl or ethyl; and alternatively each $R^2$ may be methyl.

The organosilicon compound may be an alkoxysilane of formula B-1): $R^1_{(4-a)}SiOR^2_a$, where $R^2$ is as described above, each $R^1$ is independently selected from the group consisting of a monovalent hydrocarbon group as described hereinbelow and a monovalent halogenated hydrocarbon group as described hereinbelow, and subscript a is 1 to 4. Suitable monovalent hydrocarbon groups for $R^1$ are exemplified by alkyl, and alkenyl, as described hereinbelow. Suitable halogenated hydrocarbon groups for $R^1$ are exemplified by haloalkyl, as described hereinbelow. Alternatively, alkyl groups may be selected from the group consisting of methyl, ethyl, and propyl. Alternatively, alkenyl groups may be selected from the group consisting of vinyl, allyl, and hexenyl. Alternatively, haloalkyl groups may be selected from the group consisting of chloromethyl, chloropropyl, trifluoropropyl. Alternatively, subscript a may be 3 to 4.

Suitable alkoxysilanes are commercially available, e.g., suitable tetraalkoxysilanes include tetraethoxysilane and tetramethoxysilane, which are available from Gelest, Inc. of Morrisville, Pennsylvania, USA. Trialkoxysilanes, which are also commercially available from Gelest include, 3-chloropropyltrimethoxysilane, 3-chloropropyltriethoxysilane, 3-chloroisobutyltrimethoxysilane, 3,3,3-trifluoropropyltrimethoxysilane, nonfluorohexyltrimethoxysilane, nonafluorohexyltriethoxysilane, 3-bromopropyltrimethoxysilane, 7-bromoheptyltrimethoxysilane, 4-bromobutyltrimethoxysilane, 5-bromopentyltrimethoxysilane, 2-(chloromethyl)allyltrimethoxysilane, cyclohexyltrimethoxysilane, cyclopentyltrimethoxysilane, methyltrimethoxysilane, n-propyltrimethoxysilane, n-butyltrimethoxysilane, t-butyltrimethoxysilane, hexyltrimethoxysilane, isooctyltrimethoxysilane, (3,3-dimethylbutyl)triethoxysilane, pentyltriethoxysilane, chloromethyltriethoxysilane, 5-hexenyltrimethoxysilane, 3-cyclohexenyltrimethoxysilane, vinyltrimethoxysilane, vinyltriethoxysilane, and vinyltriisopropoxysilane, allyltrimethoxysilane, allyltriethoxysilane, and 7-octenyltrimethoxysilane.

Alternatively, the organosilicon compound may be an organosiloxane oligomer or polymer. The organosiloxane oligomer or polymer may have unit formula B-2): $(R^XR^3_2SiO_{1/2})_o(R^3_3SiO_{1/2})_p(R^3_2SiO_{2/2})_q(R^XR^3SiO_{2/2})_r(R^X SiO_{3/2})_s(R^3SiO_{3/2})_t(SiO_{4/2})_u$, where $R^X$ represents a group of the formula $—OR^2$ as described above, subscripts o, p, q, and r have values such that o≥0, p≥0, q≥0, r≥0, s≥0, t≥0, u≥0, a quantity (o+r+s) has an average value of 1 or more, alternatively 1 to 6, alternatively 1 to 3, and alternatively 1 to 2; and each $R^3$ is an independently selected monovalent hydrocarbon group as described hereinbelow. Alternatively, a quantity (o+p+q+r+s+t+u) may be at least 3, alternatively 3 to 2000. Alternatively, a quantity (q+r) may be 1 to 2,000; alternatively 1 to 50. Alternatively, a quantity (o+p) may be 0 to 50, alternatively 0 to 2. Alternatively, 1≥s≥0. Alternatively, 1≥t≥0. Alternatively, the quantity (o+r+s) has an average value of 1 to 6, alternatively 1 to 3, and alternatively 1 to 2. Suitable monovalent hydrocarbon groups for $R^3$ are exemplified by alkyl, alkenyl, and aryl as described hereinbelow. Suitable halogenated hydrocarbon groups for $R^3$ are exemplified by haloalkyl, as described hereinbelow. Alternatively, alkyl groups may be selected from the group consisting of methyl, ethyl, and propyl. Alternatively, alkenyl groups may be selected from the group consisting of vinyl, allyl, and hexenyl. Alternatively, aryl groups may be phenyl. Alternatively, haloalkyl groups may be selected from the group consisting of chloromethyl, chloropropyl, trifluoropropyl. Alternatively, in formula B-2), each $R^X$ may be methoxy or ethoxy.

Alternatively, (e.g., when o has an average value of 2, and p=r=s=t=u=0), starting material B) may be a polydiorganosiloxane of formula B-3): $R^3_2R^XSiO—(R^3_2SiO)_b—OSiR^XR^3_2$, where each $R^3$ and each $R^X$ is are as described above, and subscript b≥1. Alternatively, subscript b may be 1 to 2,000, alternatively 5 to 900, alternatively 5 to 50, and alternatively subscript b may be 1 to 50. Alternatively, in formula B-3), each $R^3$ may be independently selected from the group consisting of alkyl (e.g., methyl, ethyl, and propyl), alkenyl (e.g., vinyl, allyl, and hexenyl), aryl (e.g., phenyl), and haloalkyl (e.g., chloromethyl, chloropropyl, and trifluoropropyl). Alternatively, in formula B-3), each $R^X$ may be methoxy or ethoxy. Polydiorganosiloxanes of formula B-3), such as methoxy terminated polydimethylsiloxane with viscosity of 5 to 12 cSt are commercially available from Gelest, Inc. and 1,3-diethoxy-1,1,3,3-tetramethyldisiloxane is commercially available from Millipore Sigma.

Alternatively, starting material B) may have unit formula B-4): $(R^3SiO_{3/2})_m(R^XR^3SiO_{2/2})_r$, where subscript m is 0 to 100, subscript r is 1 to 100, and each $R^3$ and each $R^X$ are as described above. Alternatively, subscript m may be 1 to 20. Alternatively subscript r may be 1 to 20. Alternatively, in formula B-4), each $R^3$ may be independently selected from the group consisting of alkyl (e.g., methyl, ethyl, and propyl), alkenyl (e.g., vinyl, allyl, and hexenyl), aryl (e.g., phenyl), and haloalkyl (e.g., chloromethyl, chloropropyl, and trifluoropropyl). Alternatively, in formula B-4), each $R^X$ may be methoxy or ethoxy. Examples of suitable alkoxyfunctional siloxane resins of unit formula B-4) include DOWSIL™ US-CF2403 Resin and DOWSIL™ 2405 Resin from Dow Silicones Corporation of Midland, Michigan, USA.

Starting Material C) Organohydrogensiloxane

Starting material C) is an organohydrogensiloxane having at least 1 silicon bonded hydrogen atom (SiH) per molecule. The organohydrogensiloxane may have unit formula C-1): $(HR^4_2SiO_{1/2})_g(R^4_3SiO_{1/2})_h(R^4_2SiO_{2/2})_i(HR^4SiO_{2/2})_j$, where subscripts g, h, i, and j have values such that g≥0, h≥0, a quantity (g+h) has an average value of 2, i≥0, j≥0, and a quantity (g+j)>0, and the quantity (g+j) has a value sufficient to provide the polyorganohydrogensiloxane with at least 1% silicon bonded hydrogen atoms; and each $R^4$ is an independently selected monovalent hydrocarbon group. Alternatively, each $R^4$ may be independently selected from the group consisting of alkyl (e.g., methyl, ethyl or hexyl), and aryl (e.g., phenyl).

Alternatively, a bis-SiH terminated polydialkylsiloxane may be used as starting material C) when subscript h=0, subscript j=0, subscript g=2, and subscript i=0 to 500; and each $R^4$ is an alkyl group, such as methyl. This bis-SiH terminated polydialkylsiloxane may have formula C-2): $HR^4_2SiO$—$(R^4_2SiO)_i$—$OSiHR^4_2$.

Alternatively, a mono-SiH terminated polydialkylsiloxane may be used as starting material C), when g=1, h=1, i=1 to 500, j=0 and each $R^4$ is an alkyl group, such as methyl, This mono-SiH terminated organohydrogensiloxane comprises formula C-3): $HR^4_2SiO$—$(R^4_2SiO)_i$—$SiR^4_3$, where $R^4$ is as described above, Alternatively, in formula C-3), each $R^4$ may be an alkyl group such as methyl. Alternatively, in formula C-3), subscript i may be 1.

Examples of suitable organohydrogensiloxanes for starting material C) include DOWSIL™ 6-3570 Polymer, which is commercially available from Dow Silicones Corporation of Midland, Michigan, USA; and 1,1,3,5,5,5-heptamethyltrisiloxane, which is commercially available from MiliporeSigma (Sigma-Aldrich) of St. Louis, Missouri, USA. Other suitable organohydrogensiloxanes for starting material C) include 1,1,3,3,3-pentalmethyldisiloxane and monohydride terminated polydimethylsiloxanes (which have formula C-1) above, where j is 7 to 80), which are commercially available from Gelest, Inc. of Morrisville, Pennsylvania, USA.

Starting materials B) and C) may be used in amounts sufficient to provide an SiH:SiOH molar ratio of 0.9:1 to 10:1, alternatively 1:1 to 5:1, and alternatively 2:1 to 3:1.

Starting Material D) Solvent

A solvent may be used in the method. The solvent may facilitate introduction of certain starting materials, such as starting material A) the boron containing Lewis acid. Solvents used herein are those that help fluidize the starting materials but essentially do not react with any of these starting materials. Solvent may be selected based on solubility the starting materials and volatility of the solvent. The solubility refers to the solvent being sufficient to dissolve and/or disperse the starting materials. Volatility refers to vapor pressure of the solvent.

Suitable solvents may be hydrocarbons. Suitable hydrocarbons include aromatic hydrocarbons such as benzene, toluene, or xylene; and/or aliphatic hydrocarbons such as heptane, hexane, or octane. Alternatively, the solvent may be a halogenated hydrocarbon such as dichloromethane, 1,1,1-trichloroethane or methylene chloride.

The amount of solvent can depend on various factors including the type of solvent selected and the amount and type of other starting materials selected. However, the amount of solvent may range from 0.1% to 99%, alternatively 2% to 50%, based on combined weights of starting materials A), B), and C).

Starting Material E) Neutralizing Agent

Starting material E) is neutralizing agent that may optionally be used to neutralize starting material A) after the product forms. Alumina, triphenyl amine, triphenyl phosphine, and phenylacetylene are suitable neutralizing agents. Neutralizing agents are known in the art and are commercially available, e.g., from Millipore Sigma of St. Louis, Missouri, USA. The amount of neutralizing agent used may be sufficient to provide 1 weight part to 1000 weight parts based on total weight of boron containing Lewis acid. Alternatively, when the neutralizing agent is triphenyl phosphine or phenylacetylene, the E:A ratio may be 1:1 to 20:1. Alternatively, when the neutralizing agent is alumina, the E:A ratio may be 100:1 to 1000:1.

EXAMPLES

These examples are intended to illustrate the invention and should not be interpreted as limiting the scope of the invention set forth in the claims. The starting materials in Table 1 were used in the examples herein.

TABLE 1

| Starting Material | | Description |
|---|---|---|
| C | Bis-H | 1,1,3,5,5,5-heptamethyltrisiloxane, which is commercially available from MiliporeSigma (Sigma-Aldrich) of St. Louis, Missouri, USA. |
| C | 6-3570 | DOWSIL ™ 6-3570 Polymer, which is commercially available from Dow Silicones Corporation of Midland, Michigan, USA. |
| C | MH-1109 | DOWSIL ™ MH-1109, MeH cyclics, is commercially available from Dow Silicones Corporation of Midland, Michigan, USA, having |

TABLE 1-continued

| | Starting Material | Description |
|---|---|---|
| | | formula(MeHSiO2/2)n, where each subscript n = 4, 5, or 6, and n has an average value of 4.5. |
| B | VTM | vinyltrimethoxysilane which is commercially available from MiliporeSigma (Sigma-Aldrich) of St. Louis, Missouri, USA. |
| B | CPTM | 3-chloropropyltrimethoxysilane, which is commercially available from MiliporeSigma (Sigma-Aldrich) of St. Louis, Missouri, USA. |
| B | TMOS | tetramethoxysilane, which is commercially available from MiliporeSigma (Sigma-Aldrich) of St. Louis, Missouri, USA. |
| B | CF-2403 | A silsesquioxane resin commercially available from Dow Silicones Corporation of Midland, Michigan USA having unit formula: $(MeSiO_{3/2})_x(Me(MeO)SiO_{2/2})_y(Me(MeO)_2SiO_{1/2})_z$, where subscripts x, y, and z are mole fractions with values such that $(y + 2z)/(x + y + z)$ is 1.0 to 1.2 |
| A | BCF | tris(pentafluorophenyl)borane, which is commercially available from MiliporeSigma (Sigma-Aldrich) of St. Louis, Missouri, USA. |
| | Silanol Fluid | OH terminated polydimethylsiloxane with DP of 35, is commercially available from Dow Silicones Corporation of Midland, Michigan, USA |
| | Activated Alumina, neutral | commercially available from Millipore Sigma |

In this Comparative Example 1, Bis-H and initial 201 ppm BCF was loaded and held at 50° C. for three hours while the reactor completed a steady state heat balance. When the reactor was initially charged with 14 grams (5%) of CPTM, no reaction occurred. An additional 52 ppm BCF, followed by 54 ppm more was then added and the reaction started and continued. After 180 grams of CPTM were added (65%), the reaction slowed significantly, so another 50 ppm BCF was added. At this time, the reaction exothermed to 59° C. and restarted. The reaction continued to slow throughout the rest of the addition of CPTM, but did not stop where additional BCF was required. At the end of the run, it took 45 minutes for all discernable exotherm to complete. The reaction was then held for another 50 minutes to complete a heat balance on the system. The final analysis indicated only partial conversion of the methoxysilane in CPTM to Si—O—Si linkages with a residual composition containing alkoxysilanes, with 0.4% with two residual methoxy groups and 8.5% with one residual methoxy group.

In this Working Example #1, Bis-H was loaded into a reactor and heated to 45° C., and then 19 ppm of BCF was loaded to the Bis-H. In the feed vessel, CPTM was also mixed with BCF in an amount sufficient to provide 125 ppm to the entire run. For this run, the feed tube was placed down into the reactor (underneath the surface of Bis-H) 5 centimeters above the agitator. The CPTM feed was started with an initial 20 grams (6%) and the reaction initiated without issue. After 50 grams of CPTM were fed, the temperature was dropped to 30° C. for the duration of the CPTM feed. The reaction continued throughout the entire run showing a steady heat of reaction with no evidence of the reaction slowing throughout the run. Therefore, no additional catalyst was loaded to the reactor. At the end of the CPTM feed, the reactor contents were held at 30° C. and it took 33 minutes for the discernable exotherm to complete. The reactor contents were then held for another 2.5 hours at 30° C. to complete the reaction and analyzed. The analysis indicated full conversion of the methoxysilane to Si—O—Si linkages.

Comparative Example 1 and Working Example 1 show that combining the BCF with CPTMS before beginning the reaction resulted in the benefits of catalyst not deactivating over the course of a run, and more complete reaction of the methoxy groups of CPTMS with the silicon bonded hydrogen atoms of Bis-H under the conditions tested in these examples.

In this Comparative Example #2, Bis-H was mixed with 205 ppm BCF and heated to 40° C. The VTM feed was started with an initial 10 grams (5%) and the reaction initiated. After 68% of the VTM was added, the reaction stopped, and an additional 42 ppm BCF was added. The reaction continued and then stopped again after 98% of the VTM was added. An additional 40 ppm of BCF was added, and VTM the feed was finished. At the end of the VTM feed, the reaction was held at 40° C. and it took 30 minutes for the discernable exotherm to complete. The analysis indicated full conversion of the methoxysilane to Si—O—Si linkages.

In this Working Example #2, Bis-H was loaded into a reactor and heated to 40° C., and then 60 ppm of BCF was loaded to the Bis-H. The feed vessel of VTM was also mixed with BCF in an amount sufficient to provide 120 ppm to the entire run. The VTM feed was started with an initial 10 grams (5%), and the reaction initiated. The reaction continued throughout the rest of the run showing a steady heat of reaction with no evidence of the reaction slowing throughout the run. Therefore, no additional BCF was loaded to the reactor. At the end of the VTM feed, the reactor contents were held at 40° C., and it took 30 minutes for the discernable exotherm to complete. The analysis indicated full conversion of the methoxysilane to Si—O—Si linkages.

Comparative Example 2 and Working Example 2 show that combining the BCF catalyst with VTM before beginning the reaction resulted in the benefits of catalyst not deactivating over the course of a run, and complete reaction of the methoxy groups of VTM with the silicon bonded hydrogen atoms of Bis-H using lower catalyst loading overall under the conditions tested in these examples.

In this Working Example #3, 37.9 g of 6-3570 and 38 g of toluene were mixed at RT in a 500 mL 4 neck flask equipped with thermal couple, mechanical stirrer, and water-cooled condenser adapted to a $N_2$ bubbler. 24.8 g of CPTM was premixed with 150 ppm of BCF and slowly added into the flask under vigorous stirring within 24 minutes. No additional BCF was added into the reaction, and there were no signs of the reaction slow down. Pot temperature was controlled below 35° C. using an ice bath. The reaction mixture (clear liquid) was stirred at RT for another one hour. Volatiles were removed via rotary evaporator at 80° C. and <1 mmHg for 30 minutes. The product was a white solid resin.

In this Working Example #4, Bis-H was loaded into a reactor, and 50 ppm of BCF was added thereto. In a feed vessel, a catalyzed mixture was prepared by mixing CPTM and BCF in an amount sufficient to provide a total amount of BCF of 161 ppm to the entire run. The catalyzed mixture feed was started with an initial 20 grams (6%) and the reaction initiated without issue. The reaction was run at 15° C. The reaction continued throughout the entire run showing a steady heat of reaction with no evidence of the reaction slowing throughout the run. Therefore, no additional BCF was loaded to the material. At the end of the catalyzed mixture feed, the reaction was held at 15° C., and it took 30 minutes for the discernable exotherm to complete. The analysis indicated full conversion of the methoxysilane to Si—O—Si linkages. Working Example 4 shows that the reaction can run at low temperatures.

In this Working Example #5, 132 g Bis-H was charged to a 500 mL 4 neck flask equipped with thermal couple, mechanical stirrer, and water-cooled condenser adapted to a $N_2$ bubbler. 25 ppm of BCF was added to the flask. 40.5 g CF-2403 resin and 175 ppm of BCF were mixed in an addition funnel to form a catalyzed mixture. The catalyzed mixture was slowly added into the flask within 32 minutes. An ice water bath was used to remove heat and control the pot temperature below 30° C. After 1 hour stirring at RT, $^1$H NMR indicated that the methoxy groups in the CF-2403 resin had been completely reacted. Volatiles were removed via rotary evaporator at 150° C. for 1.5 hours. The product was a clear colorless liquid.

In this Working Example #6, 157.3 g Bis-H was charged to a 500 mL 4 neck flask equipped with thermal couple, mechanical stirrer, and water-cooled condenser adapted to a $N_2$ bubbler. 25 ppm of BCF was added to the flask. 25.0 g TMOS and 175 ppm of BCF were mixed in an addition funnel to form a catalyzed mixture. The catalyzed mixture was slowly added into the flask within 40 minutes. An ice water bath was used to remove heat and control the pot temperature below 30° C. After 1 hours stirring at RT, $^1$H NMR indicated that Si—OMe residual content was 0.3%. Continued stirring for another 1.5 hours. Then 7.3 g of alumina was added to the flask and stirred for 2 hours at RT. After filtration through a 0.45 μm filter membrane, the volatiles were removed via rotary evaporator at 150° C. for 50 minutes. The product was a clear colorless soft gel having a melting point higher than 80° C.

In this Working Example #7, Bis-H was charged to a 4 neck flask and heated to 40° C., and then 22 ppm of BCF was loaded to the Bis-H. The feed vessel of CPTM was also mixed with BCF accounting for 96 ppm to the entire run. The CPTM feed was started continuously and initiated fine. The reaction continued throughout the entire run showing a steady heat of reaction with the reaction only starting to slow near the very end but still having a good rate. Therefore, no additional BCF was loaded to the reaction mixture. At the end of the CPTM feed, a temperature ramp to 70° C. over 1 hour was started, an estimate indicated the discernable exotherm stopped after 30 minutes. The reaction mixture was then held for 1 hour at 70° C. after the ramp to complete the reaction and analyzed. The analysis indicated >99.5% conversion of the methoxysilane to Si—O—Si linkages.

In this Comparative Example #3, MH-1109 was combined with 50 ppm BCF in a flask. Silanol Fluid (DP 35) was combined with 50 ppm BCF in a feed vessel. After feeding half the mixture of silanol fluid containing 50 ppm BCF into the catalyzed mixture of MH-1109 and 50 ppm BCF, the reaction mixture in the flask gelled. This comparative example showed that the order of addition is not effective for the OH functional polyorganosiloxane (silanol fluid) tested under these conditions.

INDUSTRIAL APPLICABILITY

Boron-containing Lewis acids, such as tris(pentafluorophenyl)borane, may be quickly deactivated in the presence of silicon hydrides. The inventors surprisingly found that the boron-containing Lewis acid may be combined with an alkoxysilyl functional organosilicon compound to form a catalyzed mixture, and thereafter the catalyzed mixture can be fed into a reactor containing a silicon hydride functional organosilicon compound, thereby controlling the resulting the exotherm and obtaining complete reaction (higher yields) with lower catalyst levels and more control than using a different order of addition. Furthermore, the inventors surprisingly found that lower temperatures increase the reactivity as well as catalyst lifetime.

The polyorganosiloxanes prepared by the method describe herein find use in various applications as, including, but not limited to, a dispersant, a wetting agent, an antiblocking additive, a surface tension modifier, a surface treating agent, an additive for agricultural compositions, an additive for coatings, an additive for paints, a cosmetic ingredient, or a siloxane modifier.

Definitions and Usage of Terms

Abbreviations used in the specification have the definitions in Table 5, below.

TABLE 5

| Abbreviations | |
| --- | --- |
| Abbreviation | Definition |
| DP | degree of polymerization |
| g | gram |
| GC | gas chromatography |
| Me | methyl |
| mL | milliliters |
| NMR | nuclear magnetic resonance |
| ppm | parts per million |
| RT | room temperature of 25° C. |
| μm | micrometer |

All amounts, ratios, and percentages are by weight unless otherwise indicated. The amounts of all starting materials in a composition total 100% by weight. The SUMMARY and ABSTRACT are hereby incorporated by reference. The articles 'a', 'an', and 'the' each refer to one or more, unless otherwise indicated by the context of specification. The singular includes the plural unless otherwise indicated. The disclosure of ranges includes the range itself and also anything subsumed therein, as well as endpoints. For example, disclosure of a range of 2.0 to 4.0 includes not only the range of 2.0 to 4.0, but also 2.1, 2.3, 3.4, 3.5, and 4.0 individually, as well as any other number subsumed in the range. Furthermore, disclosure of a range of, for example, 2.0 to 4.0 includes the subsets of, for example, 2.1 to 3.5, 2.3 to 3.4, 2.6 to 3.7, and 3.8 to 4.0, as well as any other subset subsumed in the range. Similarly, the disclosure of Markush groups includes the entire group and also any individual members and subgroups subsumed therein. For example, disclosure of the Markush group a hydrogen atom, an alkyl group, an alkenyl group, or an aryl group, includes the member alkyl individually; the subgroup alkyl and aryl; and any other individual member and subgroup subsumed therein.

"Alkyl" means a branched or unbranched, saturated monovalent hydrocarbon group. Examples of alkyl groups include methyl, ethyl, propyl (including n-propyl and/or iso-propyl), butyl (including iso-butyl, n-butyl, tert-butyl, and/or sec-butyl), pentyl (including, iso-pentyl, neopentyl, and/or tert-pentyl); and n-hexyl, n-heptyl, n-octyl, n-nonyl, and n-decyl, as well as branched saturated monovalent hydrocarbon groups of 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylmethyl, phenylethyl, phenyl propyl, and phenyl butyl. Aralkyl groups have at least 7 carbon atoms. Monocyclic aralkyl groups may have 7 to 12 carbon atoms, alternatively 7 to 9 carbon atoms, and alternatively 7 to 8 carbon atoms. Polycyclic aralkyl groups may have 7 to 17 carbon atoms, alternatively 7 to 14 carbon atoms, and alternatively 9 to 10 carbon atoms.

"Alkenyl" means a branched, or unbranched monovalent hydrocarbon group, where the monovalent hydrocarbon group has a double bond. Alkenyl groups include vinyl, allyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means a branched, or unbranched monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a hydrocarbon group derived from an arene by removal of a hydrogen atom from a ring carbon atom. Aryl is exemplified by, but not limited to, phenyl and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or polycyclic, e.g., bicyclic or with more than two rings. Bicyclic carbocycles may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated (e.g., cyclopentane or cyclohexane), partially unsaturated (e.g., cyclopentene or cyclohexene), or fully unsaturated (e.g., cyclopentadiene or cycloheptatriene).

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

"Monovalent hydrocarbon group" means a univalent group made up of hydrogen and carbon atoms. Monovalent hydrocarbon groups include alkyl, aralkyl, alkenyl, alkynyl, and cycloalkyl groups as defined above.

"Monovalent halogenated hydrocarbon group" means a monovalent hydrocarbon group where one or more hydrogen atoms bonded to a carbon atom have been formally replaced with a halogen atom. Halogenated hydrocarbon groups include haloalkyl groups, halogenated carbocyclic groups, and haloalkenyl groups. Haloalkyl groups include fluorinated alkyl groups and fluorinated cycloalkyl groups such as trifluoromethyl ($CF_3$), fluoromethyl, trifluoroethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl; and chlorinated alkyl and chlorinated cycloalkyl groups such as chloromethyl, 3-chloropropyl 2,2-dichlorocyclopropyl, 2,3-dichlorocyclopentyl. Haloalkenyl groups include chloroallyl.

The term "comprising" and derivatives thereof, such as "comprise" and "comprises" are used herein in their broadest sense to mean and encompass the notions of "including," "include," "consist(ing) essentially of," and "consist(ing) of". The term "consisting of" and derivatives thereof, such as "consist of" and "consists of" are used herein to mean be composed or made up of the recited elements and excludes additional elements. The term "consisting essentially of" and derivatives thereof, such as "consist essentially of" and "consists essentially of" means and encompasses "consist(ing) of" means including the recited elements and may include additional elements that are not essential, e.g., to the invention. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims.

Embodiments of the Invention

In a first embodiment, a method for preparing a functionalized polyorganosiloxane comprises:

1) combining starting materials consisting essentially of
   A) a boron-containing Lewis acid catalyst, and
   B) an organosilicon compound having an average, per molecule of at least 1 (alternatively 1 to 6, alternatively 1 to 4, alternatively 1 to 3, and alternatively 1 to 2) silicon bonded groups of the formula —$OR^2$; wherein each $R^2$ is an independently selected monovalent hydrocarbon group of 1 to 6 carbon atoms, thereby forming a catalyzed mixture; and thereafter
2) adding the catalyzed mixture into a starting material comprising
   C) an organohydrogensiloxane having at least 1 silicon bonded hydrogen atom per molecule, thereby preparing a product comprising the functionalized polyorganosiloxane and a by-product comprising $HR^2$.

In a second embodiment, the method of the first embodiment further comprises: adding additional boron-containing Lewis acid catalyst, to C) the organohydrogensiloxane before adding the catalyzed mixture to the organohydrogensiloxane in step 2).

In a third embodiment, the additional boron containing Lewis acid catalyst in the second embodiment is present in an amount of 5 ppm to 250 ppm based on weight of C) the organohydrogensiloxane.

In a fourth embodiment, in the method of any one of the first to third embodiments, step 2) is performed at a temperature of 5° C. to 40° C.

In a fifth embodiment, in the method of any one of the first to fourth embodiments, A) the boron containing Lewis acid catalyst, and when present, and any additional boron containing Lewis acid catalyst, is provided in a total amount of 50 ppm to 6000 ppm (alternatively 50 to 600 ppm), based on combined weights of B) the organosilicon compound and C) the organohydrogensiloxane.

In a sixth embodiment, in step 1) of the method of any one of the first to fifth embodiments, A) the boron containing Lewis acid catalyst is present in an amount of 5 ppm to 600 ppm (alternatively 15 ppm to 600 ppm and alternatively 15 ppm to 250 ppm) based on weight of B) the organosilicon compound.

In a seventh embodiment, the method of the first embodiment is performed at a temperature of 5° C. to 70° C. (alternatively 5° C. to 65° C., alternatively 10° C. to 60° C., alternatively 15° C. to 50° C., alternatively 20° C. to 35° C., alternatively 5° C. to 30° C., and alternatively 30° C.).

In an eighth embodiment, the catalyzed mixture in step 1) is heated to 40° C. to 70° C. before step 2) in the method of the first embodiment.

In a ninth embodiment, the catalyzed mixture is cooled to less than 40° C. in step 2) of the method of the eighth embodiment.

In a tenth embodiment, the method of the first embodiment is performed at a temperature of 10° C. to <25° C.

In an eleventh embodiment, the boron-containing Lewis acid is a trivalent boron compound with at least one perfluoroaryl group in the method of any one of the preceding embodiments.

In a twelfth embodiment, the boron-containing Lewis acid is a trivalent boron compound with 1 to 3 perfluoroaryl groups per molecule in the method of any one of the preceding embodiments.

In a thirteenth embodiment, the boron-containing Lewis acid is selected from the group consisting of $(C_5F_4)(C_6F_5)_2B$; $(C_5F_4)_3B$; $(C_6F_5)BF_2$; $BF(C_6F_5)_2$; $B(C_6F_5)_3$; $BCl_2(C_6F_5)$; $BCl(C_6F_5)_2$; $B(C_6H_5)(C_6F_5)_2$; $B(C_6H_5)_2(C_6F_5)$; $[C_6H_4(mCF_3)]_3B$; $[C_6H_4(pOCF_3)]_3B$; $(C_6F_5)B(OH)_2$; $(C_6F_5)_2BOH$; $(C_6F_5)_2BH$; $(C_6F_5)BH_2$; $(C_7H_{11})B(C_6F_5)_2$; $(C_8H_{14})B(C_6F_5)$; $(C_6F_5)_2B(OC_2H_5)$; or $(C_6F_5)_2B$—$CH_2CH_2Si(CH_3)$ in any one of the first to twelfth embodiments.

In a fourteenth embodiment the boron containing Lewis acid catalyst is tris(pentafluorophenyl)borane in the method of any one of the preceding embodiments.

In a fifteenth embodiment, B) the organosilicon compound is an alkoxysilane of formula: $R^1_{(4-a)}SiOR^2_a$, where each $R^1$ is independently selected from the group consisting of a monovalent hydrocarbon group and a monovalent halogenated hydrocarbon group, each $R^2$ is a monovalent hydrocarbon group of 1 to 6 carbon atoms, and subscript a is 1 to 4 (alternatively 3 to 4) in the method of any one of the preceding embodiments.

In a sixteenth embodiment, the alkoxysilane in the fifteenth embodiment has each $R^1$ independently selected from the group consisting of alkyl (e.g., methyl, ethyl, and propyl), alkenyl (e.g., vinyl, allyl, and hexenyl), and haloalkyl (e.g., chloromethyl, chloropropyl, and trifluoropropyl).

In a seventeenth embodiment, B) the organosilicon compound is an organosiloxane of formula: $R^3_2R^XSiO$—$(R^3_2SiO)_b$(—$OSiR^XR^3_2$), where each $R^3$ is independently selected from the group consisting of a monovalent hydrocarbon group and a monovalent halogenated hydrocarbon group, each $R^X$ is the group of formula —$OR^2$, and subscript b 1(alternatively 1 to 2,000; alternatively 1 to 50) in the method of any one of the first to fourteenth embodiments.

In an eighteenth embodiment, the organosiloxane of the seventeenth embodiment has each $R^3$ independently selected from the group consisting of alkyl (e.g., methyl, ethyl, propyl), alkenyl (e.g., vinyl, allyl, hexenyl), aryl (e.g., phenyl), and haloalkyl (e.g., chloromethyl, chloropropyl, trifluoropropyl).

In a nineteenth embodiment, starting material B) has unit formula: $(R^1SiO_{3/2})_m(R^1R^XSiO_{2/2})_n(R^1R^X_2SiO_{1/2})_z$, where subscript m is 0 to 20, subscript n is 1 to 20, subscript z is 0 to 20 each $R^1$ is independently selected from the group consisting of a monovalent hydrocarbon group and a monovalent halogenated hydrocarbon group, and each $R^X$ is the group of formula —$OR^2$ in the method of any one of the first to fourteenth embodiments.

In a twentieth embodiment, C) the organohydrogensiloxane has unit formula: $(HR^4_2SiO_{1/2})_g(R^4_3SiO_{1/2})_h(R^4_2SiO_{2/2})_i(HR^4SiO_{2/2})_j$, where subscripts g, h, i, and j have values such that g≥0, h≥0, a quantity (g+h) has an average value of 2, i≥0, j≥0, and a quantity (g+j)>0, and the quantity (g+j) has a value sufficient to provide the polyorganohydrogensiloxane with at least 1% silicon bonded hydrogen atoms; and each $R^4$ is an independently selected monovalent hydrocarbon group (e.g., alkyl such as methyl, aryl such as phenyl) in the method of any one of the preceding embodiments. Alternatively, a quantity. (i+j) is 0 to 1000.

In a twenty-first embodiment, subscript h=0, subscript j=0, subscript g=2, subscript j is 0 to 500; and each $R^4$ is an alkyl group, such as methyl, in the organohydrogensiloxane in the twentieth embodiment.

In a twenty-second embodiment, g=1, h=1, i=1, and j=0, and the organohydrogensiloxane comprises formula: $HR^4_2SiO$—$(R^4_2SiO)$—$SiR^4_3$, in the organohydrogensiloxane in the twentieth embodiment.

In a twenty-third embodiment, the method of any one of the preceding embodiments further comprises during and/or after step 2), removing a by-product comprising $HR^2$(e.g., by burning).

In a twenty-fourth embodiment, the method of any one of the preceding embodiments further comprises: 3) neutralizing residual catalyst in the product (e.g., by adding alumina).

The invention claimed is:

1. A method for preparing a functionalized polyorganosiloxane comprising:
   1) Combining starting materials comprising
      A) a boron-containing Lewis acid, and
      B) an organosilicon compound having an average, per molecule of at least 1 silicon bonded group of the formula —$OR^2$; wherein each $R_2$ is an independently selected monovalent hydrocarbon group of 1 to 6 carbon atoms, thereby forming a catalyzed mixture, wherein the starting materials in step 1) are free of SiH functional organosilicon compounds; and thereafter
   2) adding the catalyzed mixture into a starting material comprising
      C) an organohydrogensiloxane having at least 1 silicon bonded hydrogen atom per molecule, thereby preparing a product comprising the functionalized polyorganosiloxane and a by-product comprising $HR^2$,
      where in steps 1) and 2) of this method, the boron containing Lewis acid is provided in a total amount of 50 ppm to 600 ppm, based on combined weights of the organosilicon compound and the organohydrogensiloxane.

2. The method of claim 1, where step 2) is performed at a temperature of 5° C. to 40° C.

3. The method of claim 1, where the method is performed at a temperature of 5° C. to 70° C.

4. The method of claim 1, where the catalyzed mixture in step 1) is heated to 40° C. to 70° C. before step 2).

5. The method of claim 4, where the catalyzed mixture is cooled to less than 40° C. in step 2).

6. The method of claim 1, where the method is performed at a temperature of 10° C. to <25° C.

7. The method of claim 1, where B) the organosilicon compound is selected from the group consisting of:
   an alkoxysilane of formula: $R^1_{(4-a)}SiOR^2_a$, where each $R^1$ is independently selected from the group consisting of a monovalent hydrocarbon group and a monovalent halogenated hydrocarbon group, each $R^2$ is a monovalent hydrocarbon group of 1 to 6 carbon atoms, and subscript a is 1 to 4;
   an organosiloxane of formula: $R^3_2R^XSiO—(R^3_2SiO)_b—SiR^XR^3_2$, where each $R^3$ is independently selected from the group consisting of a monovalent hydrocarbon group and a monovalent halogenated hydrocarbon group, each $R^X$ is the group of formula —$OR^2$, and subscript b≥1; and
   a resin of unit formula: $(R^1SiO_{3/2})_m(R^1R^XSiO_{2/2})_n(R^1R^X_2SiO_{1/2})_z$,
where subscript m is 0 to 20, subscript n is 1 to 20, subscript z is 0 to 20, each $R^1$ is independently selected from the group consisting of a monovalent hydrocarbon group and a monovalent halogenated hydrocarbon group, and each $R^X$ is the group of formula —$OR^2$.

8. The method of claim 1, where C) the organohydrogensiloxane has unit formula: $(HR^4_2SiO_{1/2})_g(R^4_3SiO_{1/2})_h(R^4_2SiO_{2/2})_i(HR^4SiO_{2/2})_j$, where subscripts g, h, i, and j have values such that g≥0, h≥0, a quantity (g+h) has an average value of 2, i≥0, j≥0, and a quantity (g+j)>0, a quantity (i+j) ranges from 0 to 1000, and the quantity (g+j) has a value sufficient to provide the polyorganohydrogensiloxane with at least 1% silicon bonded hydrogen atoms; and each $R^4$ is an independently selected monovalent hydrocarbon group.

9. The method of claim 1, further comprising: neutralizing residual boron-containing Lewis acid in the product.

10. The method of claim 1, further comprising: during and/or after step 2), removing the by-product comprising $HR^2$.

11. A method for preparing a functionalized polyorganosiloxane comprising:
    1) combining starting materials comprising
       5 ppm to 600 ppm, based on weight of starting material B), of A) a boron-containing Lewis acid, and
       B) an organosilicon compound having an average, per molecule of at least 1 silicon bonded group of the formula —$OR^2$; wherein each $R^2$ is an independently selected monovalent hydrocarbon group of one to 6 carbon atoms, thereby forming a catalyzed mixture; and thereafter
    2) adding the catalyzed mixture into starting materials comprising
       C) an organohydrogensiloxane having at least 1 silicon bonded hydrogen atom per molecule, thereby preparing a product comprising the functionalized polyorganosiloxane and a by-product comprising $HR^2$, and
       5 ppm to 250 ppm, based on weight of C) the organohydrogensiloxane, of additional boron-containing Lewis acid.

12. The method of claim 11, where step 2) is performed at a temperature of 5° C. to 40° C.

13. The method of claim 11, where the method is performed at a temperature of 5° C. to 70° C.

14. The method of claim 11, where the catalyzed mixture in step 1) is heated to 40° C. to 70° C. before step 2).

15. The method of claim 14, where the catalyzed mixture is cooled to less than 40° C. in step 2).

16. The method of claim 11, where the method is performed at a temperature of 10° C. to less than 25° C.

17. The method of claim 11, where C) the organohydrogensiloxane has unit formula: $(HR^4_2SiO_{1/2})_g(R^4_3SiO_{1/2})_h(R^4_2SiO_{2/2})_i(HR^4SiO_{2/2})_j$, where subscripts g, h, i, and j have values such that g≥0, h≥0, a quantity (g+h) has an average value of 2, i≥0, j≥0, and a quantity (g+j)>0, a quantity (i+j) ranges from 0 to 1000, and the quantity (g+j) has a value sufficient to provide the polyorganohydrogensiloxane with at least 1% silicon bonded hydrogen atoms; and each $R^4$ is an independently selected monovalent hydrocarbon group.

18. The method of claim 11, further comprising: 3) neutralizing residual boron-containing Lewis acid in the product.

19. The method of claim 11, further comprising: during and/or after step 2), removing the by-product comprising $HR^2$.

20. The method of claim 11, where the boron containing Lewis acid, and when present, and any additional boron containing Lewis acid, is provided in a total amount of 50 ppm to 6006000 ppm, based on combined weights of B) the organosilicon compound and C) the organohydrogensiloxane.

* * * * *